United States Patent [19]

Tock

[11] 4,128,392

[45] Dec. 5, 1978

[54] CALCINER FOR FINE LIMESTONE

[75] Inventor: Wilfred H. Tock, Emmaus, Pa.

[73] Assignee: Fuller Company, Catasauqua, Pa.

[21] Appl. No.: 772,413

[22] Filed: Feb. 28, 1977

Related U.S. Application Data

[62] Division of Ser. No. 603,638, Aug. 11, 1975.

[51] Int. Cl.² ........................................... F27B 15/00
[52] U.S. Cl. ........................................ 432/58; 432/78
[58] Field of Search ............................ 432/15, 58, 78

[56] References Cited

U.S. PATENT DOCUMENTS

| | | | |
|---|---|---|---|
| 2,932,498 | 4/1960 | Metcalfe et al. | 432/58 |
| 3,595,542 | 7/1971 | Ashmann | 432/58 |
| 3,932,117 | 1/1976 | Ritzmann | 432/58 |

*Primary Examiner*—John J. Camby

*Attorney, Agent, or Firm*—Frank H. Thomson

[57] ABSTRACT

A method and apparatus for calcining finely divided material such as limestone and dolomite. The apparatus is especially useful for calcining materials having a size of less than ¼ inch. The apparatus includes a first stage fluidized bed calcining apparatus and a second stage flash calcining apparatus. Raw material is supplied to the fluid bed reactor. The large particles are calcined within this reactor, withdrawn from the reactor and supplied to a cooler. The fines are elutriated with the spent fluidizing gas and supplied to a cyclone separator. The separated fines are supplied to a flash calciner where they are calcined. The separated spent fluidizing gases may be used as combustion gas in the flash calciner. The calcined fines are removed from the flash calciner and supplied to a cyclone separator and from there to a cooler.

5 Claims, 1 Drawing Figure

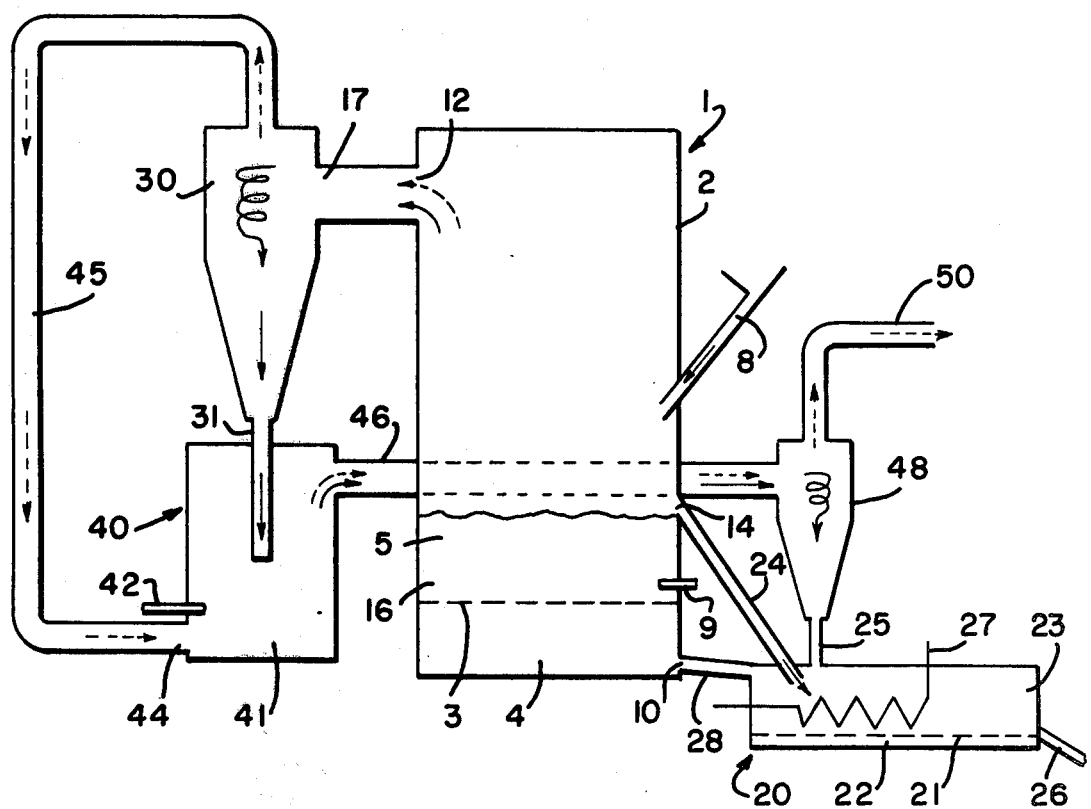

CALCINER FOR FINE LIMESTONE

This is a division, of application Ser. No. 603,638, filed Aug. 11, 1975.

BACKGROUND OF THE INVENTION

The present invention to a method and apparatus for calcining solid particulate material such as limestone and dolomite having a size of minus ¼ inch or minus ⅜ inch. More particularly, the method and apparatus relate to calcining such materials without separating the ultra fine materials from the more coarse particles.

Prior to the present invention, it was known to calcine limestone in various furnaces such as a rotary kiln and to calcine limestone, dolomite and other materials having a size on the order of ¼ inch to ⅜ inch in a furnace such as a fluidized bed reactor. Fine stone which is calcined in a fluidized bed reactor often consists of minus ¼ inch or minus ⅜ inch material which means that a large percentage of the material is ultra fine on the order of minus 20 mesh. In a fluidized bed furnace, combustion air is passed upwardly through a bed of the material to be treated to maintain a fluidized bed. In order to maintain the material in a fluidized state, the fluidizing air must be supplied at a certain velocity. This velocity is such that the ultra fine material will be elutriated out of the fluidized bed reactor with the spent fluidizing gases prior to being calcined. Simply recycling the fines to the reactor will result in a repetition of the elutriation.

In order to overcome the problem of the ultra fines not being calcined, these fines can either be wasted which means wasting a valuable product, screened out of the feed material for separate treatment, or treated as in U.S. Pat. No. 3,588,063 wherein the fine material elutriated out of the fluid bed reactor is compacted and recycled to the reactor with new feed. None of these solutions is satisfactory as each requires unnecessary equipment or waste of material.

Prior to the present invention, it was known to calcine fine material on the order of 20 mesh in a flash calciner. A flash calciner for limestone is shown in U.S. Pat. No. 2,505,617. Although such fine material can be treated in a flash furnace, larger particles of material such as those normally treated in a fluidized bed reactor cannot be successfully calcined in a flash calciner.

Prior to the present invention, it is believed there is no known means for continuously treating all fine material of minus ¼ inch size. The treatment of such material must be interrupted when considering the ultrafine material or dust which, by definition, will be a substantial part of minus ¼ inch material.

SUMMARY

It is therefore the principal object of this invention to provide a method of continuously calcining finely divided materials without producing unusable and undesirable dust.

It is a further object of this invention to provide an apparatus for heat processing finely divided materials wherein all of the finely divided materials including the dust is processed without interrupting the processing by a separate treatment of the fines.

It is a still further object of this invention to provide an apparatus for calcining finely divided material.

In general, the foregoing and other objects will be carried out by the process of heat treating finely divided particles of material to produce a treated product comprising the steps of establishing and maintaining a first heat treatment zone; supplying finely divided material to be treated to said first heat treatment zone; supplying gases to said first heat teatment zone for treating the finely divided material; withdrawing treated coarse particles from the first heat treatment zone; withdrawing the treating gases and elutriated fines from said first heat treatment zone; separating the elutriated fines from the treating gases; supplying treatment gases to said second heat treatment zone for treating said fines; and withdrawing treated fines from said second heat treatment zone.

BRIEF DESCRIPTION OF THE DRAWING

The invention will be described in connection with the annexed drawing wherein the sole FIGURE is a diagrammatic view of the apparatus for carrying out the method of the present invention.

DESCRIPTION OF THE PREFERRED EMBODIMENT

Referring to the drawing, there is shown a fluid bed reactor or first heat treatment vessel generally indicated at 1 which includes a vessel 2 having a gas permeable grid 3 mounted therein dividing the vessel 2 into a plenum chamber 4 below the grid 3 and a material chamber 5 above the grid. The vessel 2 includes a raw material inlet 8, a fuel inlet 9 and a fluidizing air inlet 10. The fluidized bed reactor 1 also includes a spent fluidizing gas outlet 12 and a coarse material outlet 14.

In operation of the fluidizing bed reactor 1 raw material to be calcined is supplied through 8 to the material chamber 5. Fluidizing gas is supplied through inlet 10 to the plenum 4 for passage through the grid 3 to fluidize the material within the material chamber 5 and form a fluidized bed 16. Fuel is supplied through inlet 9 for combustion within the fluidized bed 16 to produce a temperature sufficient to calcine material within the bed 16. Calcined material is withdrawn from the bed 16 and vessel 2 through outlet 14 to a material cooler 20 which will be described in greater detail hereinafter.

In order to maintain a fluidized bed 16, the gas flow through the grid 3 must have a velocity sufficient to fluidize the coarser particles, but such velocity will cause the fines to be elutriated from the reactor 1 with the spent fluidizing gases through the outlet 12. These fines have such a short residency within the vessel 2 that they are only partly calcined. Prior to the present invention these fines were exhausted to a dust collector for either disposal or further treatment such as pelletizing and return to the reactor. By the present invention these fines are further heat processed to achieve substantially complete calcination thereof.

The elutriated fines and spent fluidizing gases are conveyed to a cyclone separator 30 which is flow connected directly to outlet 12 by conduit 17. in the separator 30 solid particles are separated from the spent fluidizing gases. The solid particles are supplied from the separator 30 to a flash furnace 40 of any suitable design but preferably of the design shown in U.S. Pat. No. 3,452,968. Fuel is supplied to the furnace 40 through conduit 42 from a source (not shown). Combustion gas is supplied to the furnace 40 from a source through inlet 44 so that combustion takes place within a flash furnace 40 where the fines are substantially completely calcined. The calcined fines and spent combustion gases are exhausted from the calciner 40 through outlet conduit 46 to a separator 48. The solids are discharged from separator 48 to cooler 20 while the gases are discharged through outlet 50 to a dust collector (not shown) and atmosphere or to a preheater.

In the embodiment shown, the source of combustion gas for the calciner 40 is separated spent fluidizing gases supplied to the combustion air inlet 44 by conduit 45. If desired, the combustion gases may be supplied to conduit 44 from an independent source.

In the embodiment shown, the cooler 20 is of the fluidized bed type including a grid 21 dividing the cooler into a plenum chamber 22 and a material chamber 23 with material supplied from reactor 1 through outlet 14 and conduit 24 to material chamber 23 and from cyclone separator 48 to chamber 23 by way of conduit 25. Cooled material is withdrawn through conduit 26. If desired, an indirect heat exchanger 27 may be included in the cooler 20.

The spend cooling air from the fluidized bed 20 can be used for preheating fluidizing air supplied to reactor through conduit 28.

As a modification to the present invention, other types of material coolers may be used without departing from the scope of the present invention.

The process of the present invention should be apparent from the foregoing description of the apparatus. Raw material such as finely divided limestone of minus ¼ inch or minus ⅜ inch is supplied to the reactor 1 through material inlet 8. The raw material will inherently include a large proportion of ultra fine particles with as much as 50% of the feed being minus 20 mesh. Fluidizing air is supplied to the plenum chamber 4 for passage through grid 3 to form a fluidized bed of material 16 which bed 16 forms a first heat treatment zone. Fuel is supplied to the bed for combustion therein to carry out the heat treatment or calcination of the material which forms the fluid bed 16. As material is supplied to the bed 16, material in the bed overflows by displacement through outlet 14 to cooler 20 through conduit 24. The residence time of material in the vessel 2 can be controlled by the feed rate of raw material in a well known manner to insure substantially complete calcination of the coarse material.

The spent fluidizing gas will be exhausted from the vessel 2 through outlet 12 and elutriate the ultra fine material which makes up a large portion of the feed. The residence time of the ultra fine material (minus 20 mesh) is so short that little or no calcination takes place. The temperature in the freeboard (that area of the vessel 1 above the bed 16 and below the outlet 12) is insufficient to calcine the fines if the reactor 1 is being properly operated.

The cyclone separator 30 separates the elutriated fines from the spent fluidizing gases and supplies them through conduit 31 to the flash furnace or second heat treatment vessel 40. Fuel and combustion air are supplied to the vessel 40 through conduits 42 and 44, respectively. The conduit 30 and fuel duct 42 are positioned in a known manner so that the minus 20 mesh material supplied to the second heat treatment vessel 40 pass through the flame or hottest part of the vessel and the material is rapidly calcined while in suspension within the second heat treatment zone 41 of the vessel 40. In a known manner, the second heat treatment zone 41 is maintained at a temperature sufficient to assure calcination of the fine material in vessel 40.

The calcined fine material and spent combustion gases are supplied through conduit 46 to separator 48 where the calcined material is separated and supplied to cooler 20 through conduit 25.

It can thus be seen that the entire raw material will be calcined. The natural effect of elutriation of the fines from the fluidized bed reactor is used to separate the fines from the coarser particles and the spent fluidizing air is used to convey these fines to a vessel which is designed for heat treating the fines. Any fines which remain in the fluid bed and are carried to outlet 14 will be calcined in the reactor 1 because the residency time therein will be sufficient.

In the embodiment shown, the reactor 1 is designed so that there is sufficient excess air volume so that the spent fluidizing gases discharged from the vessel 1 contain sufficient oxygen to support combustion within the second heat treatment vessel 40. In this manner, the combustion gases supplied to the flash furnace 40 is preheated so that the amount of fuel required by the calciner 40 is minimal.

As modifications of the embodiment shown in the drawing, the spent cooling air may be used to supply preheated combustion air to the flash calciner 40 or to a raw material preheater. In such a case, the conduit 45 could be eliminated and a separate air preheater could be used to supply preheated fluidizing air to the plenum chamber 4. With such an arrangement the size of the fluidized bed reactor could be reduced because excess air in an amount sufficient to support combustion in the calciner 1 would not have to be supplied to the reactor 1. In such an arrangement, the overall fuel economies may vary from the embodiment shown.

From the foregoing it should be apparent that the objects of this invention have been carried out. A method and apparatus have been provided which insures complete calcining of not only the larger particles of minus ¼ inch material, but also the treatment of the fine particles without the requirement of compacting these fines prior to heat processing of the material or without the requirement of initial screening of the raw material to remove the minus 20 mesh material.

It is intended that the foregoing description be merely that of preferred embodiments and that the invention be limited solely by that which is within the scope of the appended claims.

I claim:

1. Apparatus for heat treating solid particulate material for producing a treated product comprising:
    a first heat treatment vessel;
    means for supplying raw material to be treated to said first heat treatment vessel;
    means for supplying air to said first heat treatment vessel;
    means for supplying fuel to said first heat treatment vessel for combustion therein for heat treating solid particulate material in the first heat treatment vessel;
    said means for supplying raw material to said first heat treatment vessel defining means for retaining coarse particles in said first heat treatment vessel for a period of time sufficient to heat treat the coarse particles;
    means for discharging treated coarse particulate material from said first heat treatment vessel;
    means for exhausting air and elutriated fines from said first heat treatment vessel;
    means flow connected to said means for exhausting air and elutriated fines for separating the elutriated fines from the air exhausted from the first heat treatment vessel;

a second heat treatment vessel;

means for supplying air to said second heat treatment vessel;

means flow connecting the means for separating and the second heat treatment vessel for supplying the separated elutriated fines from said means for separating to said second heat treatment vessel;

means for supplying fuel to said second heat treatment vessel for combustion therein for heat treating the elutriated fines therein; and means for discharging treated elutriated fines from said second heat treatment vessel.

2. Apparatus for heat treating solid particulate material according to claim 1 further comprising cooler means for cooling the heat treated material; said cooler means being flow connected to said first heat treatment vessel by said means for discharging treated coarse particles from said first heat treatment vessel and to said second heat treatment vessel by said means for discharging treated material from said second heat vessel.

3. Apparatus for heat treating solid particulate material according to claim 2 wherein said cooler means includes means for supplying cooling air thereto for passage through the heat treated material for cooling the heat treated material whereby the cooling air is heated by the heat treated material and means for exhausting heated cooling air from said cooler means and being flow connected to said means for supplying air to said first heat treatment vessel.

4. Apparatus for heat treating solid particulate material according to claim 3 wherein said first heat treatment vessel is a fluid bed reactor including a gas permeable grid mounted therein dividing said vessel into an upper material chamber and a lower plenum chamber and for supporting a bed of material within said material chamber; said means for supplying air to said first heat treatment vessel being connected to said lower plenum chamber whereby the air passes through said gas permeable grid and fluidizes solid particulate material in said material chamber and said means for supplying fuel to the first heat treatment vessel is connected to the material chamber whereby combustion takes place within the fluidized solid particulate material.

5. Apparatus for heat treating solid particulate material according to claim 4 wherein said means for supplying air to said second heat treatment vessel is flow connected to said means for separating the elutriated fines from the air exhausted from the first heat treatment vessel.

* * * * *